United States Patent [19]
Zobel et al.

[11] Patent Number: 6,102,103
[45] Date of Patent: Aug. 15, 2000

[54] HEAT BATTERY

[75] Inventors: Warner Zobel, Boblingen; Roland Strahle, Unterensingen; Andreas Stolz, Stuttgart; Stephan Horz, Filderstadt; Thomas Jantschek, Neuweiler, all of Germany; Hendrikus Theodores Comelis van Hoof, Rosmalen, Netherlands; Anthony C. De Vuono, Racine, Wis.; Randolph S. Herrick, Racine, Wis.; Scott R. Larrabee, Racine, Wis.; Jeffrey A. Logic, Racine, Wis.; Alan P. Meissner, Franklin, Wis.; C. James Rogers, Racine, Wis.; Mark G. Voss, Franksville, Wis.

[73] Assignee: Modine Manufacturing Company, Racine, Wis.

[21] Appl. No.: 08/967,564

[22] Filed: Nov. 12, 1997

[51] Int. Cl.[7] ............................................. F28D 17/00
[52] U.S. Cl. ........................... 165/10; 165/41; 165/104.27
[58] Field of Search .................................. 165/41, 10, 71, 165/104.27

[56] References Cited

U.S. PATENT DOCUMENTS

| 3,872,875 | 3/1975 | Raidl, Jr. ................................. 165/71 |
| 5,090,474 | 2/1992 | Schatz ..................................... 165/10 |
| 5,279,355 | 1/1994 | Schatz ..................................... 165/10 |
| 5,449,035 | 9/1995 | Strahle et al. ............................ 165/10 |
| 5,762,130 | 6/1998 | Uibel et al. .............................. 165/71 |

FOREIGN PATENT DOCUMENTS

| 4140144 | 6/1993 | Germany ................................. 165/71 |
| 44 41 352 C1 | 2/1994 | Germany . |
| 196 19 810 A1 | 11/1996 | Germany . |
| 0770844 A2 | 2/1997 | Germany . |
| 404124592 | 4/1992 | Japan ..................................... 165/10 |
| 406088687 | 3/1994 | Japan ..................................... 165/10 |
| 406249454 | 9/1994 | Japan ..................................... 165/71 |

*Primary Examiner*—Christopher Atkinson
*Attorney, Agent, or Firm*—Wood, Phillips, VanSanten, Clark & Mortimer

[57] ABSTRACT

Venting difficulties in a heat battery including a first container (10) for housing a heat storage salt that may be in the solid phase or in the liquid phase, a heat exchanger (22) within the container (10) and a second container (12) surrounding the first container (10) in generally spaced relation to provide an insulating space (14) about the first container (10) along with coolant inlet and outlet connections (40, 42) to the heat exchanger (22) are avoided in a vent system (52) including a vent inlet (66) generally centrally located in the top wall (56) of the first container (10) generally centrally of the ends thereof. A vent passage includes a check valve (106) located in close proximity to the vent opening (66) and the vent opening is surrounded by a cup shaped baffle (60) having an opening (62) facing the interior of the container (10). A filter (78) is located between the check valve (106) and the opening (62) to the baffle (60). The check valve (106) is located in a valve housing (104) which itself serves as a safety valve to vent pressure in the event the check valve (106) malfunctions.

44 Claims, 3 Drawing Sheets

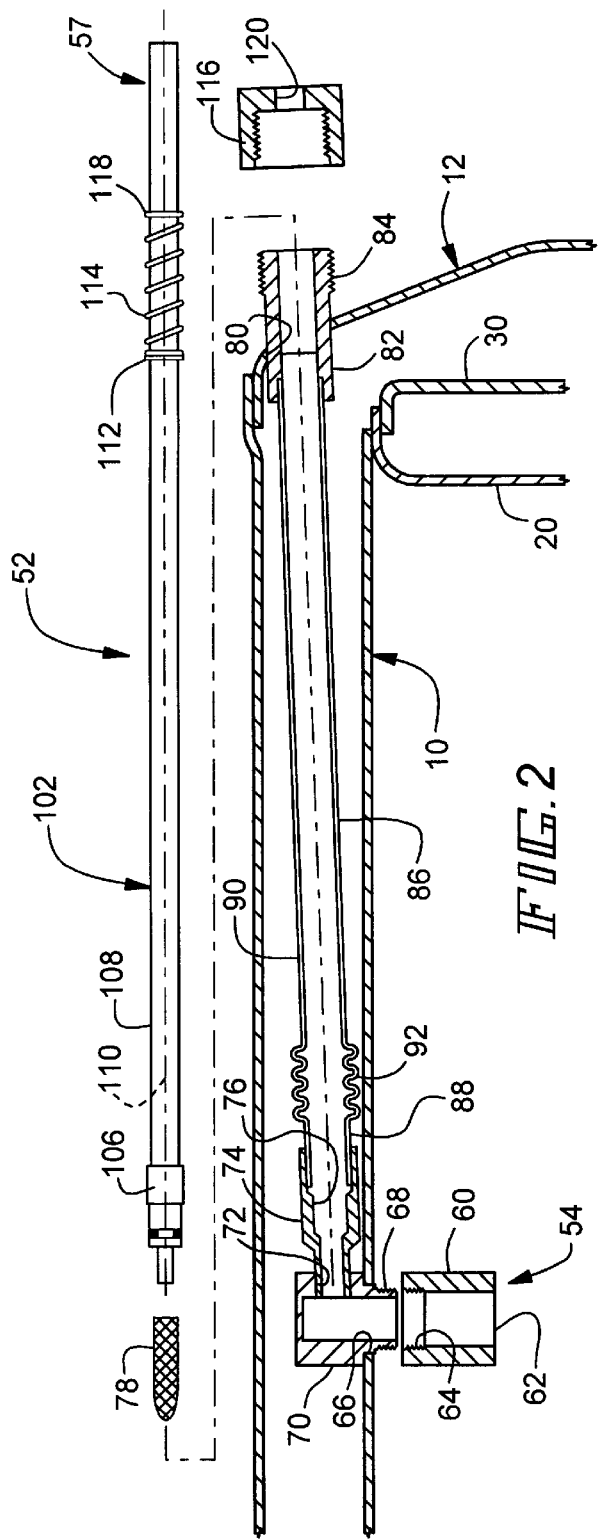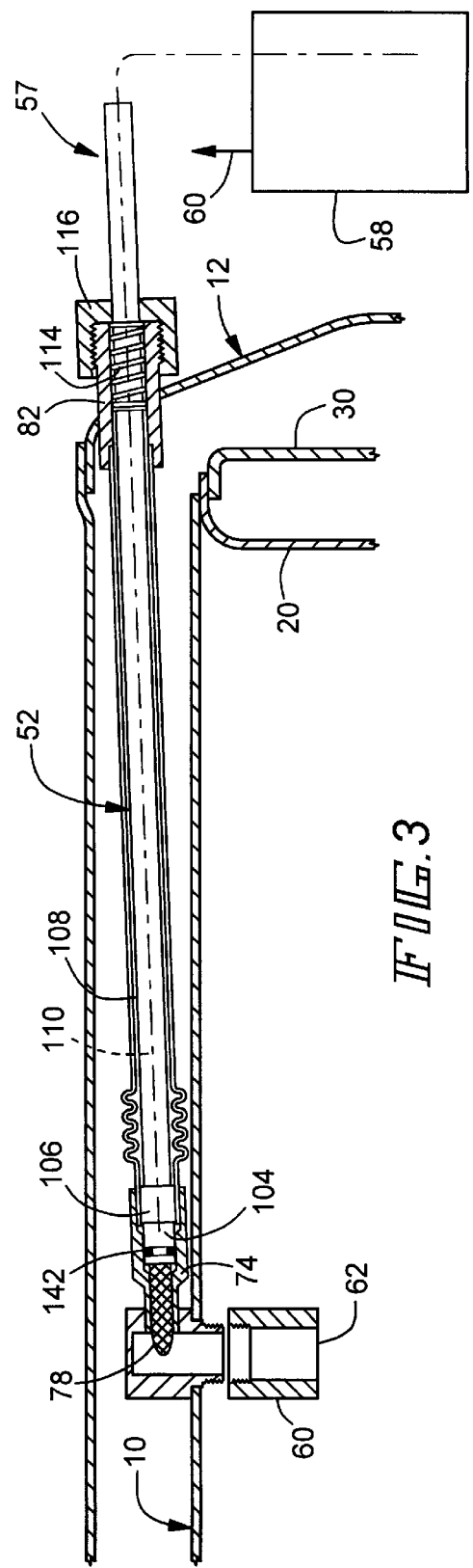

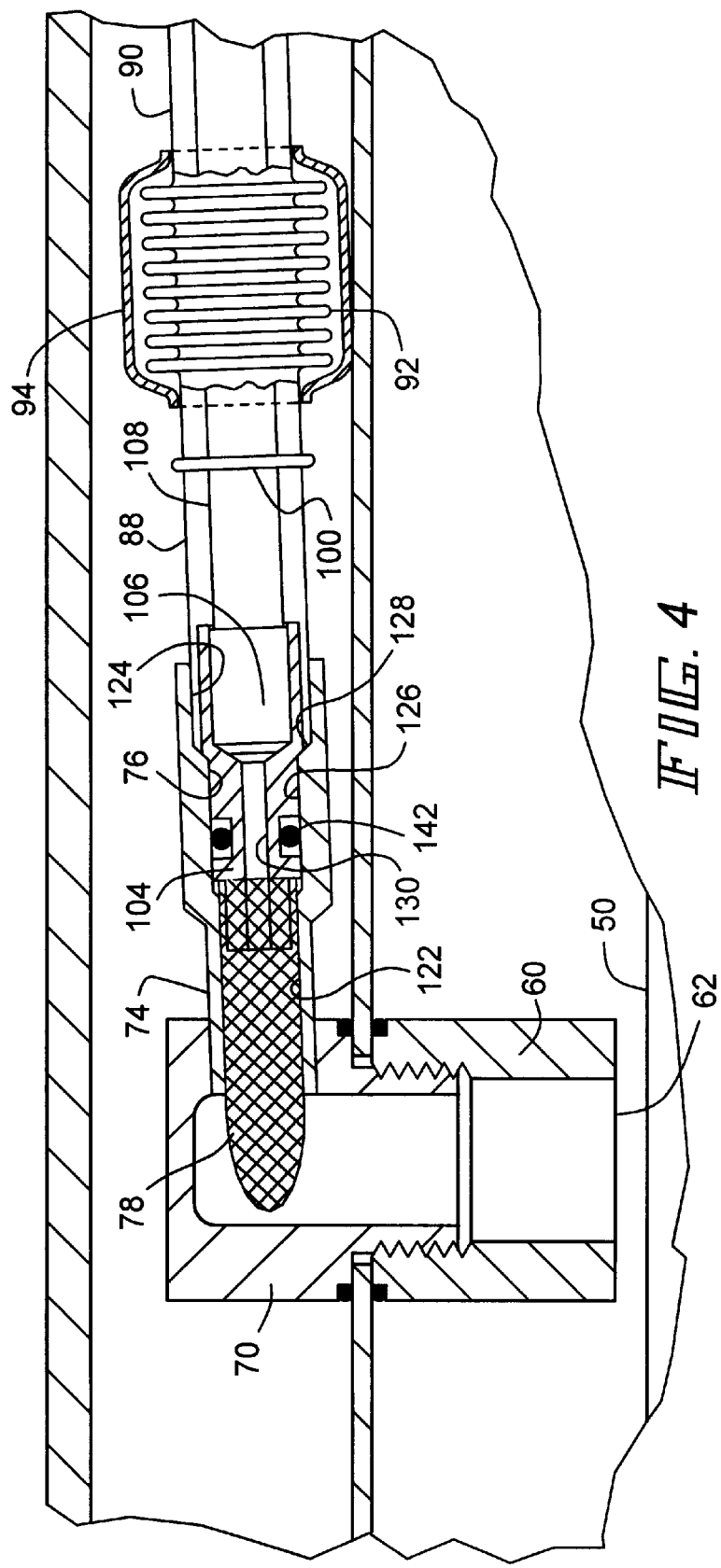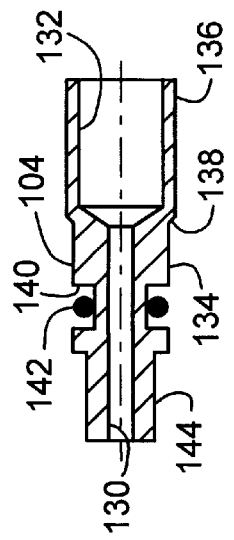

HEAT BATTERY

FIELD OF THE INVENTION

This invention relates to so called latent heat batteries or accumulators. More specifically, it relates to a heat battery that is ideally suited for, but not limited to, vehicular applications.

BACKGROUND OF THE INVENTION

Recent years have seen an increased interest in so called heat batteries for vehicular use. Such heat batteries typically include a heat storage medium which usually, but not always, is a phase change material such as a salt or a high specific heat single phase material. The battery includes an internal heat exchanger through which engine coolant is circulated. To charge the battery with heat, hot engine coolant that is heated during engine operation is passed through the heat exchanger and its heat rejected to the heat storage medium. Subsequently, the heat may be utilized to heat the passenger compartment or to immediately provide warm coolant to the engine for the purpose of reducing emissions and easing start-up wear by circulating now cold coolant through the heat exchanger to be warmed first and then passed to the engine. The stored heat may also be used to operate the vehicle defroster for immediate defrosting. At this time, heat will be rejected by the heat storage medium to the coolant to warm the same; and will thereafter be rejected to the engine to warm it.

In cold climates, the use of such heat batteries in vehicles is particularly desirable because they provide a means whereby hot coolant for use in a vehicle heater is immediately available upon entry into the vehicle and/or is available to warm the engine long prior to the time at which the engine would warm as a result of internal combustion occurring therein. The benefits of immediately being able to warm the passenger compartment are obvious. Those skilled in the art will also recognize that internal combustion engines produce the greatest quantity of undesirable emissions during start up. Cold or cool engines do not promote effective combustion of fuel and as a consequence, hydrocarbon emissions from uncombusted fuel may be substantial.

Prior attempts to provide commercially viable heat batteries have not proved all together successful. In one such attempt, the heat storage medium was a salt that could change between the solid and liquid phases in the temperature range of operation to absorb or reject the latent heat of fusion of the salt to maximize heat storage capability. Unfortunately, the material employed was highly corrosive which led to a number of obvious difficulties.

More recently, it has been proposed to utilize magnesium nitrate hexahydrate containing a small amount of lithium nitrate. This material works well but when placed in a heat battery formed of aluminum, gases are generated which must be vented.

It has therefore been proposed in European patent application EPO 770,844, the entire disclosure of which is herein incorporated by reference, to provide a means of venting the chamber of the heat battery containing the heat storage medium to avoid pressure build up. It is therein proposed to utilize a check valve that is soldered or otherwise located in an opening in the jacket defining the so called salt chamber (the chamber that contains the heat exchanger and the heat storage medium) which may then be connected to a vent opening to the coolant circulation system. While this approach has generally avoided the problem caused by pressure build up, it has not been 100% successful in so doing.

In particular, when a heat battery is mounted in a vehicle, it is subjected to all the forces that are encountered when the vehicle accelerates, decelerates, goes around a corner or skids on a skid pad resulting in substantial centrifugal forces, as well as the force of gravity as the vehicle travels over uneven or nonlevel terrain. In such situations, the heat storage material, if it is a phase change material, is most always in the liquid phase as a result of being heated by operation of the vehicle engine. The heat storage material, being in the liquid phase, may splash around within the salt jacket and onto the valve inlet. In some instances, it is conceivable that it could even immerse the valve inlet. If the salt is permitted to form a meniscus on the valve inlet, when the battery vents, the salt may enter the valve.

Entry of the heat storage material or salt into the check valve has been known to disable the check valve either resulting in its inability to open to relieve excess pressure or, more likely, in being unable to close, which may allow the interior of the salt jacket to freely vent to and from the cooling system, an occurrence that is undesirable.

The present invention is directed to overcoming one or more of the above problems.

SUMMARY OF THE INVENTION

It is the principal object of the invention to provide a new and improved heat battery. More particularly, it is an object of the invention to provide a new and improved heat battery of the type including a container for housing a salt or other phase change material that may be in the solid phase at a relatively low ambient temperature and in the liquid phase at temperatures on the order of the operating temperature of a vehicular cooling system. A heat exchanger is located within the container and includes a coolant flow path through which vehicular engine coolant may be flowed to exchange heat with the phase change material. A body of insulation surrounds the container to provide insulation for the same. In the usual case, this will be provided by a second container that surrounds the first container in generally spaced relation, but in some instances, the second container can be omitted so long as some means of insulating the first container is provided. Coolant inlet and outlet connections extend through the insulating material and the container to the heat exchanger so as to deliver coolant thereto to exchange heat with the phase change material.

In a preferred embodiment, the container has a top wall flanked by two spaced side walls that are intended to be located along a generally horizontal line transverse to the longitudinal axis of a vehicle in which the heat battery is to be installed. A vent is provided for the salt container which includes an outlet as well as an inlet in the top wall of the first container.

According to one facet of the invention, the inlet to the vent is located generally centrally of the spaced side walls so as to minimize contact of the phase change material with the vent.

According to another facet of the invention, a cup-shaped baffle having a downwardly facing opening is disposed within the first container and surrounds the vent inlet. The baffle further assists in maintaining the phase change material away from the vent.

According to still another facet of the invention, a two piece baffle is provided for the vent path inlet and includes a baffle piece located in the first container about the inlet and a fixture piece on the outside of the first container, usually in the space between the two containers. The pieces have interengaging threads extending through an opening in the top wall of the salt container so as to be self fixturing for brazing within the battery.

According to still another facet of the invention, a vent opening is provided in the first container as generally alluded to previously and a check valve is connected to the vent opening for allowing fluid flow out of the first container but substantially prevents fluid flow in the reverse direction. A conduit having a passage of capillary size is connected to the check valve oppositely of the vent opening. According to this facet of the invention, even a small discharge of gas is sufficient to clear the vent passage defined by the capillary passage in the conduit.

According to still another facet of the invention, a fixture, including a valve receiving pocket, is in fluid communication with the vent opening. A check valve is movably received in the pocket and is openable to allow fluid flow from the vent opening but substantially prevents fluid flow in the reverse direction. The check valve, when in the pocket, sealingly engages the fixture. Means are provided for biasing the check valve into the pocket and into sealed engagement therewith. The biasing means is such as to be overcome by a predetermined pressure at the vent opening so that the check valve will begin to move out of the pocket and the sealed engagement therewith to relieve the pressure at the vent opening in the event that the check valve or capillary tube becomes blocked. This arrangement provides a safety factor in the event the check valve becomes inoperable.

According to still another facet of the invention, both a first inner container and a second outer container surrounding the first container are employed and an opening is located in the second container and is aligned with the vent. A conduit extends between the vent and the opening in the second container. A check valve assembly for the vent is removably received in the conduit and means are provided for locating the check valve assembly at a predetermined position within the conduit. According to this facet of the invention, the check valve may be removed from the assembly to be serviced if required.

According to still another facet of the invention, a filter is provided for the vent opening and is made of a material that is not wetted by the phase change material.

In a preferred embodiment, the filter material is a porous polytetrafluoroethylene material.

According to still another facet of the invention, the vent opening is located in the upper surface of the first container and a second container surrounds the first container and has a vent opening therein. A vent conduit is connected to the first container vent opening and extends through the second container vent opening. The vent conduit is connected and sealed to the second container at the second container vent opening and is formed of two tube sections. A bellows interconnects the two tube sections to provide fluid communication between them. This facet of the invention compensates for a misalignment between the two openings and even more importantly, provides a means of accommodating differential thermal expansion and contraction and relative movement between the two containers.

According to still another facet of the invention, a vent conduit connects the vent opening in the first container and extends through the second container to the exterior thereof. An enlarged reservoir is connected to the conduit and is located exteriorly of the second container. A vent is disposed in the upper surface of the reservoir. This facet of the invention provides a means whereby vented liquid or condensate is captured in the reservoir while vented gas may be vented through the reservoir to the exterior of the vehicle.

According to still another facet of the invention, the vent for the first container includes a vent conduit extending away from a vent opening therein. A check valve is located in the conduit in close proximity to the vent opening so that stored heat in the phase change material will warm the check valve to prevent condensation or freezing of moisture therein.

In a preferred embodiment, the conduit is located in a space between two containers including the first container so that heat in the phase change material will warm the conduit to minimize condensation therein as well as to prevent freezing.

According to still another facet of the invention, the heat battery has a cup shaped baffle with a downwardly facing opening within the first container as mentioned previously. A quantity of the phase change material is disposed in the first container to substantially, but not completely, fill the same. The quantity of phase change material is such that the baffle will not be contacted by the phase change material when the heat battery is stationary and in its normal operating position. The volume of the cup shaped baffle is such that if the downwardly facing opening is covered by the phase change material as a result of acceleration, deceleration, centrifugal forces or the encountering of uneven terrain, pressure in the first container will pressurize the phase change material into the baffle a distance insufficient to reach the vent inlet before the downwardly facing opening is uncovered by the phase change material to prevent phase change material from being delivered to the vent.

Other objects and advantages will become apparent from the following specification taken in connection with the drawings.

DESCRIPTION OF THE DRAWINGS

FIG. 2 is an enlarged exploded, sectional view of a vent employed in the heat battery;

FIG. 3 is an enlarged sectional view of the vent with the components in assembled relation;

FIG. 4 is a further enlarged, fragmentary view of part of the vent components;

FIG. 5 is a sectional view of a valve housing employed in the invention.

DESCRIPTION OF THE PREFERRED EMBODIMENT

Figure 1:
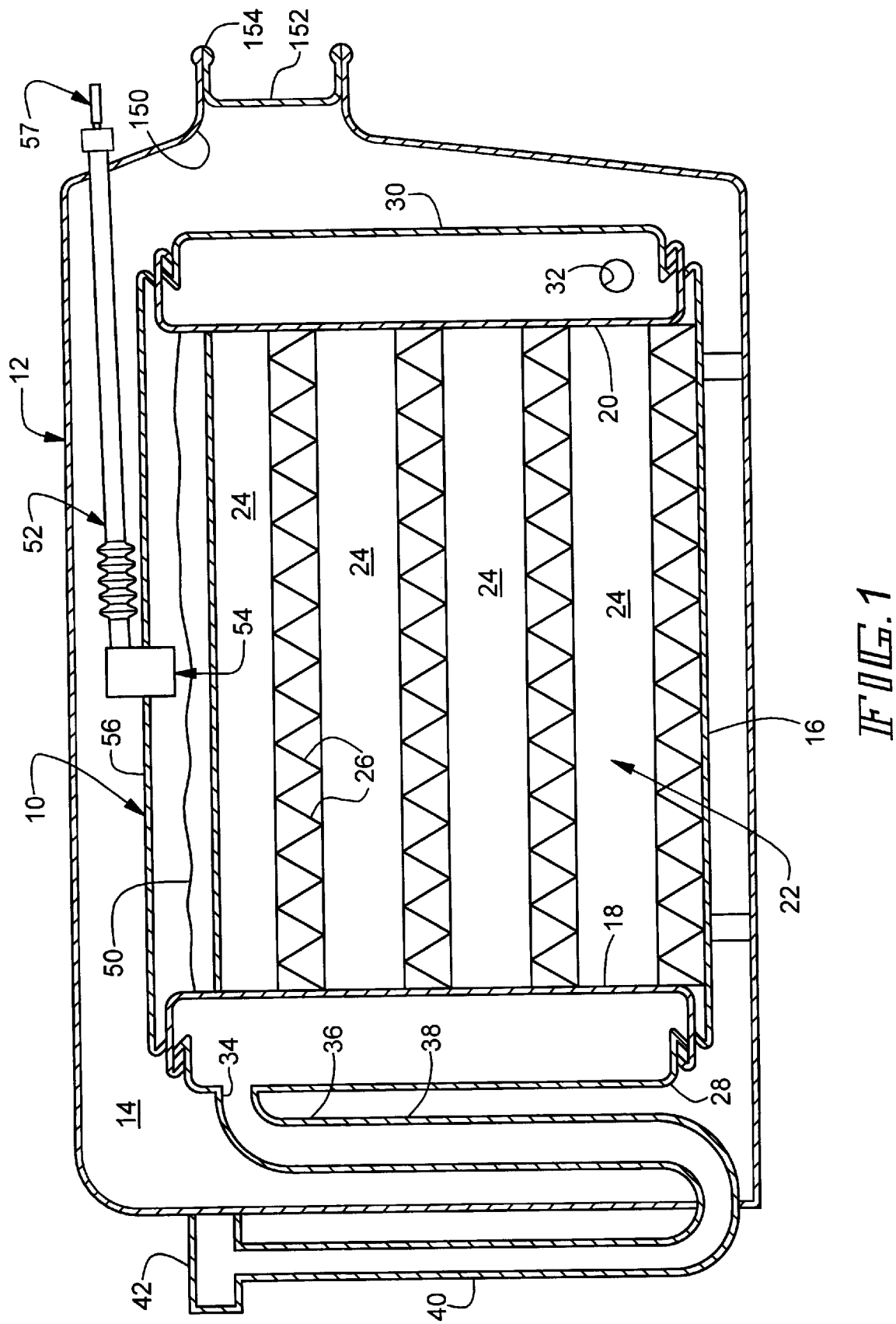
FIG. 1 is a somewhat schematic sectional view of a heat battery made according to the invention.

An exemplary embodiment of a heat battery is illustrated somewhat schematically in FIG. 1 and will be described herein in the context of a heat battery intended for use in vehicular applications. However, it will be understood that the heat battery is not so limited, but may be used with efficacy in most any type of environment requiring the use of a heat battery or a temporary thermal storage device.

Referring to FIG. 1, the heat battery includes a first or internal container 10, sometimes referred to as a salt jacket, which is surrounded, in spaced relation by an outer, or so called insulating, jacket 12 or second container. The space 14 between the jackets 10 and 12 will usually be subject to a high vacuum as is well known and additionally will be typically filled with an insulating material as, for example, a material known in the art as "aerogel" powdered insulation.

In some instances, the outer jacket 12 may be eliminated, but in all cases, the inner jacket 10 will be surrounded by some sort of insulating material or structure.

The inner jacket 10, in the embodiment illustrated, is in the form of a sheath 16 sealed to the periphery of opposed headers 18, 20 of a heat exchanger, generally designated 22. As is well known, flattened tubes 24 extend between the headers 18, 20 and may have serpentine fins 26 or other fins extending between adjacent ones of the tubes 24. Tanks 28 and 30 close off headers 18 and 20 respectively.

In one case, two of the structures just described will be located in generally side by side relationship and a cross over tube 32 will interconnect the spaces between corresponding ones of the headers 20 and tanks 30. Alternatively, in a single structure as described, a baffle (not shown) in the tank 28 and header 18 construction separating the inlet and outlet ports may be used.

Each of the tanks 28 includes a port 34 connected to a U-shaped tube 36. One leg 38 of the U-shaped tube is in the space 14 while the other leg 40 is on the exterior of the jacket 12. Both of the tubes 36 (only one of which is shown) terminate at an external fixture block 42 which may be brazed to the jacket 12. One of the tubes 36 will serve as an inlet for engine coolant through the heat exchanger 22 and the other will serve as an outlet for the engine coolant. Hoses interconnect the vehicle cooling system and the fixture block 42.

The jacket 10 and its connection to the header components 18, 20 of the heat exchanger 22 define a closed space which will typically be almost completely, but not quite, filled with a salt or phase change material. Specifically, with the jacket 10 stationary and level, it will be filled to a level 50 with a salt of the type that will undergo a phase change between the liquid and the solid phases over a typical range of operating values for engine coolant, i.e., a range from about −20° C. up to 130° C. In a preferred form of the invention, the phase change material, which serves as a heat storage material, is magnesium nitrate hexahydrate containing a small amount of lithium nitrate as is known. The various components described thus far are made of metal, preferably aluminum, and as a consequence, the phase change material reacts to form corrosive gases which must be vented to prevent pressure build up in the battery.

To avoid pressure build up, the invention includes a vent system, generally designated 52, to prevent the build up of pressure within the heat battery and to dispose of the vented material in a harmless fashion. As seen in FIG. 1, the venting system 52 includes an inlet end, generally designated 54, in the jacket 10 generally centrally thereof between the side walls as defined by the headers 18 and 20. The inlet end 54 is in the upper or top surface 56 of the salt jacket 10. This of course assumes installation in a vehicle or the like with the surface 56 uppermost. In this connection, it is desirable that the headers 18, 20 and tanks 28, 30 be spaced along a generally horizontal line which is transverse to the longitudinal axis of the vehicle in which the heat battery is installed.

The venting system 52 also includes an outlet end, generally designated 57, which is on the exterior of the insulation jacket 12. As seen in FIG. 3, the outlet end 57 is connected via a suitable conduit to an enlarged reservoir 58 which in turn includes a gas vent 60 in its top or upper surface that may discharge to the exterior of the vehicle. The enlarged reservoir 58 is typically sized so as to be sufficiently large to hold all liquid discharged to the venting system 52 over, for example, a ten year period. Assuming relatively normal usage of the vehicle, (it is thought) that the volume of the reservoir 58 should thus be such as to hold approximately 75 ml of liquid to achieve this goal. That is to say, it is expected that 75 ml of liquid will be discharged into the reservoir 58 over a ten year period. However, as a practical matter, much of such liquid will evaporate and the vapors thereof will exit via the vent 60 from the reservoir 58 in any event.

FIGS. 2 and 3 illustrate the venting system 52 in exploded and assembled relation, respectively. The inlet end 54 of the system 52 includes a generally cup shaped baffle 60 of a generally cylindrical configuration. The same includes an inlet opening 62 which faces downwardly toward the level 50 (FIG. 1 and 4) of the salt in the jacket 10. The upper end of the baffle 60 is threaded as at 64.

The salt jacket includes a vent opening 66 through which the threaded end 68 of a cup shaped fixture 70 passes. The baffle 60 is threaded onto the threaded end 68 of the fixture 70 and the arrangement is such that the two are self fixturing. That is to say, the two may be brought into proper assembled relation with the jacket 10 so as to be brazed in place during a subsequent assembly operation.

The cup shaped fixture 70 includes a side opening 72 which receives a pocket defining structure 74 having an internal pocket 76.

Oppositely of the pocket 76, the structure 74 mounts a filter 78 within the interior of the cup shaped fixture 70. The filter 78 is made of material that will not be wetted by the salt contained within the jacket 10. One material that may be used is a porous polytetrafluoroethylene. If desired, the filter 78 may be in the form of a plug of sintered polytetrafluoroethylene granules. Alternatively, it may be made of a film like material of the type sold under the registered trademark "Gortex." In this case, it may be in the form of a small, condom-like sheath fitted over the end of the male end 144 at a location within the cup shaped fixture 70.

Preferably, the filter 78 has a "salt break through pressure differential" of at least about 3 psi. This valve will prevent the salt from passing through the filter 78 to the venting system 52 with an appropriate safely factor. In one embodiment, the salt break through pressure differential is 13 psi using a polytetrafluoroethylene filter having a pore size of 0.2 microns.

Near one side, the insulation jacket 12 includes an opening 80 which receives a nipple 82 having threads 84 on an end thereof exterior of the insulation jacket 12. A thin walled stainless steel tube 86 extends between the pocket defining structure 74 and the nipple 82 and is sealed to both. The stainless steel tube 86 is made up of a relatively short segment 88, and a relatively long segment 90. The two are interconnected by a bellows formation 92.

Optionally, and as seen in FIG. 4, the bellows 92 may be enclosed in a housing 94. The housing 94 may be in the form of a metallic foil wrapped around the bellows 92. The purpose of the housing 94 is to prevent particles of the insulating material from entering the spaces between the convolutions defining the bellows 92 where the particles could interfere with its operation. In this regard, when the insulation is introduced into the space 14, it is customary to subject the entire heat battery to substantial agitation to cause the insulation material to settle. During such agitation, it is possible that individual granules of insulation could become lodged in the bellows 92 and interfere with its operation.

The purpose of the bellows is two fold. The first purpose is to allow for slight degrees of misalignment between the pocket defining structure 74 and the nipple 82. A second and more significant purpose is to accommodate the fact that as the jackets 10 and 12 are subjected to different temperatures, they will expand and contract at different rates and the bellows 92 compensates for thermally induced stresses as a result of such differential expansion and contraction. The bellows also compensates for stress when the containers undergo relative movement particularly during the shaking of the insulation fill.

Desirably, because the tube 86 is thin walled, at several locations along its length (only one of which is shown) the same may be provided with annular or circumferential stiffening ribs 100.

A valve assembly, generally designated 102, is located within the tube 86. The valve assembly includes a number of components including a valve housing 104 as shown in FIG. 5, a self contained check valve 106, which is of conventional construction and preferably of the ball and spring type, and an elongated thick walled tube 108. The tube 108 has a central passage 110 of capillary size, i.e., on the order of 1 mm in diameter.

Near the outlet end 57 of the venting system 52, a snap ring 112 is located on the tube 108 and a compression coil spring 114 abutted thereagainst. An internally threaded cap 116 may be located over the end 57 and threaded onto the threads 84 on the nipple 82 to abut an end 118 of the spring 114 to compress the same as will be seen, with the end 57 extending through a bore 120 and an end of the cap 116.

Returning to the pocket defining structure 74, the same includes an internally stepped bore which in part defines the pocket 76. A relatively small diameter section 122 receives the filter 78. A relatively large diameter section 124 receives the short section 88 of the outer tube 86.

An intermediate diameter section 126 movably and removably receives the valve housing 104.

A shoulder 128 defines the interface of the large diameter section 124 and the intermediate diameter section 126 of the pocket 76 and serves as a valve seat.

Referring to FIGS. 4 and 5, the valve housing 104 has an internal, axial passage 130 that opens to the small diameter section 122 of the pocket 76. Oppositely of the passage 130, the valve housing 104 includes an enlarged cavity 132 into which the check valve 106, which is of conventional construction, is received. An end of the tube 108 is force fitted into the cavity 132. The arrangement is such that flow is permitted out of the salt jacket 10 to the end 57 but is substantially inhibited in the reverse direction, dependant on the leak rate of the check valve 106.

It is important to observe that the valve housing 104 also has a stepped exterior including a relatively small diameter section 134 which is sized to snugly fit within the intermediate diameter section 126 of the pocket 76. About the cavity 132, the valve housing 104 has a relatively larger diameter section 136. The larger diameter section 136 is somewhat smaller than the large diameter section 124 of the pocket 76 and is separated from the smaller diameter section by a shoulder 138 which will abut the shoulder 128 of the pocket 76 during normal operation.

An outwardly facing annular groove 140 is located in the small diameter section 134 of the housing 104 to receive an elastomeric O-ring seal 142. The O-ring seal 142 establishes a seal against the intermediate diameter section 126 of the pocket 76 during normal operation as can be seen in FIG. 4.

The check valve system 102 is completed by a small diameter protuberance or male end 144 (FIG. 5) which receives the filter 78 and mounts it within the small diameter section 122.

When the valve system 102 is assembled as illustrated in FIG. 3, it will be seen that the cap 116 compresses the spring 114 which, acting against the snap ring 112, provides a biasing force on the tube 108 to bias the same toward the left as viewed in FIG. 3. This has the effect of urging the valve housing 104 to the left as viewed in FIG. 3 to the point where the shoulder 138 halts further such movement by engagement with the shoulder 128 on the pocket 76. At this point, the O-ring 132 will be sealed against the intermediate diameter section 126 of the pocket 76. In the usual case, the valve 106 be will selected to open at a pressure differential of approximately 10 psi so that upon the generation of pressure within the salt jacket 10, the check valve 106 will open and allow the pressure to be discharged to the capillary passage 110. In this regard, the capillary passage 110, from one end to the other, has such a small volume, that even a small discharge is sufficient to completely clear the passage 110 of condensed liquids.

In the event the check valve 106 becomes inoperative and refuses to open to discharge built up pressure, the pressure will act against the left hand end of the valve housing 104. As the pressure builds up, the valve housing 104 moves to the right as viewed in FIGS. 3 and 4 against the bias of the spring 114.

At the point where the O-ring seal 142 moves to the right of the valve seat defined by the step 128 in the pocket 76, the seal between the valve housing 104 and the pocket 76 will be lost, allowing the pressure to discharge about the body of the valve housing 104 into the space between the thin walled tube 90 and the thick walled tube 108 to relieve pressure. This pressure may vent to the atmosphere through the opening 120 in the cap 116 about the end 57 of the tube 108. Typically, the spring 114 is selected and the components located relative to one another to provide sufficient compression that the safety valve thus defined by the seal 142, the valve housing 104, and the step 128 in the pocket 76 will open at about a 22 psi pressure differential.

Another important feature of the invention is the location of the valve 106 in close proximity to the vent opening 66 in the salt jacket 10. When the same is in close proximity as indicated, conduction of heat from the hot salt via the salt jacket 10, the cup shaped fixture 70 and the pocket defining structure 74 will assure that the valve 106 is sufficiently hot that condensation of any discharge, which is rich in water, will not occur within the valve 106.

Furthermore, the location of the venting system 52 between the salt jacket 100 and the insulation jacket 12 similarly tends to assure that the same remains warm to prevent such condensation therein. At the very least, the heat present will prevent any condensation that occurs from freezing at low ambient temperatures to plug the venting system 52.

It will also be observed that the venting system 52 is at an angle slightly greater than 90° to the longitudinal axis of the cup shaped baffle 60. In one embodiment, an angle of about 97° is selected.

As a further point, the volume, location and shape of the interior of the cup shaped baffle 60 are such as to provide a "burp" effect for venting pressure when the level of salt is not as shown at 50, but rather, covers the inlet opening 62 to the baffle 60. The cup shaped baffle 60 is preferably an inverted, nominally cylindrical cup whose opening 62 is of sufficiently large diameter that it cannot be closed by a meniscus of molten salt. The central axis of the baffle 60 should be, as close as possible, on a line perpendicular to the normal level 50 of the salt. The baffle opening 62 should be at a level where contact with the salt is at a minimum for the typical operating cycle of the vehicle.

Volume of the cup shaped baffle 60 is determined by five factors including (1) the volume of the connecting vent tubing and associated hardware system for the relief valve 104, 106, (2) the maximum anticipated pressure head of the salt, associated with the worst case, off-attitude operation, (3) the baffle aspect ratio, (4) the relief valve leakage rate, and (5) the cracking pressure and flow characteristics of the check valve. Salt head pressure is defined as the average vertical height differential existing between the bottom plane of the opening 62 and the molten salt level in the worst-case situation, multiplied by the density of the salt.

Baffle volume must be sufficiently large to insure that salt, regardless of baffle attitude, will not rise in the cup-shaped baffle to a level where it could enter the vent tube 72.

The baffle aspect ratio is the ratio of the length of its central axis to its diameter, and should be maximized, but not to the extent diameter becomes small enough to allow a meniscus to form.

The check valve leakage rate must be small enough to assure that gas leakage for a worst case maneuver of the vehicle will not permit the salt level to rise to a cross section small enough to allow a meniscus to form.

As alluded to previously, the components will typically be formed of aluminum unless otherwise noted above. The components are generally brazed together and braze clad material will be located on the components where they are to be brazed together.

In addition, welds may be employed in various locations as, for example, at the connection between the pocket defining structure 74 and the cup shaped fixture 70. In addition, the cup shaped fixture 70 and the cup shaped baffle 60 may be respectively welded at their interfaces with the salt jacket 10. Similarly, the nipple 82 will typically be welded into the opening 80 in the insulation jacket 12.

In summary, a heat battery made according to the invention will provide one or more of the following features:

1. The use of a cup shaped baffle to prevent the salt from accessing a venting system.
2. The use of a cup shaped baffle and a cup shaped fixture threaded together to provide self fixturing of the baffle and its connection to the venting system.
3. The use of a nonwettable filter on the intake side of the venting system to prevent the salt from entering any substantial distance into the venting system.
4. The use of a removable valve and/or valve housing to allow servicing of the valve and filter.
5. The use of a bellows in the venting system to compensate for misalignment and eliminate thermal stress and stresses resulting from relative movement.
6. The use of a housing about the bellows so as to prevent insulation from interfering with operation of the bellows.
7. The use of a capillary passage in the venting system so that even small discharges of pressurized gas are capable of clearing condensation from the vent passage.
8. The incorporation of a safety valve feature that allows venting of the salt jacket in the event the check valve normally employed for such venting fails.
9. The location of the vent in the center of the top of the salt jacket where it is less likely to come into contact with liquid salt during acceleration, deceleration, centrifugal force effects, etc. on the vehicle on which the heat battery is installed.
10. The use of an enlarged reservoir on the vent system to capture any liquid discharged or any vapor condensate discharged from the system.
11. The sizing of the interior volume of the baffle 60 so as to achieve the "burp" feature described previously.
12. The location of the valve 106 is in close proximity to the inlet opening so that it will be warmed sufficiently to prevent condensation thereat and/or prevent freezing of such condensate as may occur.

We claim:

1. A heat battery comprising:
   a first container for housing a phase change material that may be in the solid phase at relatively low temperatures and in the liquid phase at relatively higher temperatures;
   a heat exchanger within said first container and including a coolant flow path through which coolant may be flowed to exchange heat with said material;
   means providing an insulating space about said first container;
   coolant inlet and outlet connections extending through said container to said heat exchanger;
   said first container having a top wall flanked by two spaced side walls to be located along a generally horizontal line transverse to the longitudinal axis of a vehicle in which the heat battery is to be installed;
   a vent for said first container including an outlet on the exterior of said insulating space providing means and an inlet in said top wall of said first container and generally centrally of said spaced side walls; and
   a baffle about said inlet and within said first container.

2. The heat battery of claim 1 wherein said baffle is generally cup-shaped and has a mouth said mouth opening oppositely from said top wall.

3. The heat battery of claim 2 further including a generally cup-shaped fixture disposed in the insulating space providing means, said cup-shaped baffle and said cup-shaped fixture having mating threads extending through an opening in said first container top wall to be self fixturing therein.

4. A heat battery comprising:
   a first container;
   for housing a phase change material that may be in the solid phase at relatively low temperatures and in the liquid phase at relatively higher temperatures;
   a heat exchanger within said first container and including a coolant flow path through which coolant may be flowed to exchange heat with said material;
   means providing an insulating space about said first container;
   coolant inlet and outlet connections extending through said container to said heat exchanger;
   said first container having a top wall flanked by two spaced side walls to be located along a generally horizontal line transverse to the longitudinal axis of a vehicle in which the heat battery is to be installed; and
   a vent for said first container including an outlet on the exterior of said insulating space providing means and an inlet in said top wall of said first container; and
   a cup-shaped baffle having a downwardly facing opening within said first container and surrounding said inlet.

5. The heat battery of claim 4 wherein said baffle has a mouth that opens downwardly into said first container and away from the top wall thereof.

6. The heat battery of claim 5 further including a generally cup-shaped fixture disposed in the insulating space about said first container, said cup-shaped baffle and said cup-shaped fixture having mating threads extending through an opening in said first container top wall to be self fixturing therein.

7. The heat battery of claim 4 wherein said vent, at or near said inlet, includes a filter.

8. The heat battery of claim 7 wherein said filter is made of a material that is not wetted by said phase change material.

9. The heat battery of claim 7 wherein said vent includes a valve body and said filter is attached to said valve body.

10. The heat battery of claim 7 wherein said filter has a predetermined salt break through pressure differential so that gas may pass through said filter but said phase change material may not pass through said filter until said salt break through pressure is exceeded.

11. The heat battery of claim 10 wherein said salt break through pressure differential is about 3 psi or more.

12. The heat battery of claim 10 wherein said salt break through pressure differential is about 13 psi.

13. The heat battery of claim 7 wherein said filter is a porous polytetrafluoroethylene material.

14. A heat battery comprising:
   a first container for housing a phase change material that may be in the solid phase at relatively low temperatures and in the liquid phase at relatively higher temperatures;
   a heat exchanger within said first container and including a coolant flow path through which coolant may be flowed to exchange heat with said material;
   a means surrounding said first container to provide an insulating space about said first container;
   coolant inlet and outlet connections extending through said container to said heat exchanger;
   said first container having a top wall flanked by two spaced side walls to be located along a generally horizontal line transverse to the longitudinal axis of a vehicle in which the heat battery is to be installed; and
   a vent for said first container including an outlet on the exterior of said insulating space providing means and an inlet in said top wall of said first container; and
   a two piece baffle for said inlet and including a baffle piece located in said first container about said inlet and a fixture piece in the insulating space, said pieces having interengaging threads extending through an opening in said top wall, so as to be self fixturing within said battery.

15. The heat battery of claim 14 wherein said fixture piece comprises part of said vent, and further including a vent conduit extending from said fixture piece to said outlet.

16. The heat battery of claim 15 wherein said vent conduit includes a tube having a capillary size passage.

17. The heat battery of claim 16 wherein said tube has a relatively thick wall.

18. A heat battery comprising:
   a first container for housing a phase change material that may be in the solid phase at relatively low temperatures and in the liquid phase at relatively higher temperatures;
   a heat exchanger within said first container and including a coolant flow path through which coolant may be flowed to exchange heat with said material;
   means surrounding said first container to provide an insulating space about said first container;
   coolant inlet and outlet connections extending through said container to said heat exchanger;
   a vent opening in said first container;
   a check valve connected to said vent opening for allowing fluid flow out of said first container but not substantially in the reverse; and
   a conduit having a passage of capillary size connected to said check valve oppositely of said vent opening.

19. The heat battery of claim 18 wherein said conduit is relatively thick walled.

20. The heat battery of claim 18 including a port connected to said vent opening, said check valve being slidably received in said port in sealed relation thereto, and means biasing said check valve into said port while allowing said check valve to move at least partially out of said port and said sealed relation thereto to thereby define a pressure relief valve.

21. The heat battery of claim 20 wherein said port is located oppositely of said conduit and said biasing means comprises a spring biasing said conduit against said check valve to urge said check valve into said port.

22. A heat battery comprising:
   a first container for housing a phase change material that may be in the solid phase at relatively low temperatures and in the liquid phase at relatively higher temperatures;
   a heat exchanger within said first container and including a coolant flow path through which coolant may be flowed to exchange heat with said material;
   means surrounding said first container to provide insulation about said first container;
   coolant inlet and outlet connections extending through said container to said heat exchanger;
   a vent opening in said first container;
   a fixture, including a valve receiving pocket, in fluid communication with said vent opening;
   a check valve movably received in said pocket and openable for allowing fluid flow from said vent opening but not substantially in the reverse; said check valve, when in said pocket, sealingly engaging said fixture; and
   means biasing said check valve into said pocket and sealed engagement therewith, said biasing means being such as to be overcome by a predetermined pressure at said vent opening so that said check valve will begin to move out of said pocket and said sealed engagement therewith to relieve the pressure at said vent opening even if said check valve remains closed.

23. The heat battery of claim 22 wherein said pocket includes a stepped bore including small and large diameter sections, and said check valve includes a general cylindrical housing sized to seal against said small diameter section but not said large diameter section, said large diameter section being more remote from said vent opening than said small diameter section so that pressure at said vent opening will urge said housing toward said large diameter section and out of sealing engagement with said small diameter section.

24. The heat battery of claim 23 wherein said housing is a stepped housing having a relatively small diameter section snuggly received in said bore small diameter section and a somewhat larger diameter section received within said bore large diameter section, said housing larger diameter section being smaller in diameter than said bore large diameter section; an annular groove in said housing small diameter section intermediate the ends thereof; and an O-ring seal in said annular groove, said O-ring seal having a smaller diameter than said bore large diameter section.

25. A heat battery comprising:
a first container for housing a phase change material that may be in the solid phase at relatively low temperatures and in the liquid phase at relatively high temperatures;
a heat exchanger within said first container and including a coolant flow path through which coolant may be flowed to exchange heat with said material;
a second container surrounding said first container in generally spaced relation to provide an insulating space about said first container;
coolant inlet and outlet connections extending through said containers to said heat exchanger;
a vent from said first container;
an opening in said second container and aligned with said vent;
a conduit extending between said vent and said second container opening;
a check valve assembly for said vent and removably received in said conduit; and
means for locating said check valve assembly at a predetermined position within said conduit.

26. The heat battery of claim 25 wherein said locating means comprises a biasing means for said check valve assembly to bias the same against a pressure release valve seat within said conduit;
whereby if said check valve assembly fails, a pressure buildup at said vent will urge said check valve assembly away from said seat to allow pressure relief about said check valve assembly.

27. The heat battery of claim 26 wherein said conduit is made up of two aligned tubes, and a bellows interconnecting said tubes.

28. The heat battery of claim 27 wherein said tubes include circumferential stiffening ribs.

29. The heat battery of claim 27 further including particulate insulating material in the space between said containers, and a housing about and containing said bellows to prevent said insulating material from appreciably contacting said bellows.

30. A heat battery comprising:
a first container for housing a phase change material that may be in the solid phase at relatively low temperatures and in the liquid phase at relatively high temperatures;
a heat exchanger within said first container and including a coolant flow path through which coolant may be flowed to exchange heat with said material;
means surrounding said first container to provide insulation about said first container;
coolant inlet and outlet connections extending through said container to said heat exchanger;
a vent opening in an upper surface of said first container; and
a filter for said vent opening made of a material that is not wetted by said phase change material.

31. The heat battery of claim 30 wherein said filter material is a porous polytetrafluoroethylene material.

32. The heat battery of claim 30 including a fixture in the insulation about said container and secured about said vent opening, said fixture including an interior chamber, said filter being located with said chamber.

33. The heat battery of claim 32 further including a check valve in fluid communication with said chamber at a location downstream of said filter.

34. A heat battery comprising:
a first container for housing a phase change material that may be in the solid phase at relatively low temperatures and in the liquid phase at relatively high temperatures;
a heat exchanger within said first container and including a coolant flow path through which coolant may be flowed to exchange heat with said material;
a second container surrounding said first container in generally spaced relation to provide an insulating space about said first container;
coolant inlet and outlet connections extending through said containers to said heat exchanger;
a vent opening in an upper surface of said first container;
a vent opening in said second container;
a vent conduit connected to said first container vent opening and extending to said second container vent opening, said vent conduit further being connected and sealed to said second container at said second container vent opening;
said conduit being formed of two tube sections; and
a bellows interconnecting said tube sections to provide fluid communication between them.

35. The heat battery of claim 34 further including particulate insulating material in the space between said containers, and a housing about and containing said bellows to prevent said insulating material from appreciably contacting said bellows.

36. The heat battery of claim 34 wherein said conduit terminates in a valve chamber; and a check valve removably disposed within said valve chamber via said conduit.

37. A heat battery comprising:
a first container for housing a phase change material that may be in the solid phase at relatively low temperatures and in the liquid phase at relatively higher temperatures;
a heat exchanger within said first container and including a coolant flow path through which coolant may be flowed to exchange heat with said material;
means surrounding said first container to provide an insulating space about said first container;
coolant inlet and outlet connections extending through said containers to said heat exchanger;
a vent conduit in fluid communication with the interior of said first container and having an end external of said insulating space;
an enlarged reservoir connected to said conduit end and located exteriorally of said insulating space; and
a vent in an upper surface of said reservoir.

38. A heat battery comprising:
a first container for housing a phase change material that may be in the solid phase at relatively low temperatures and in the liquid phase at relatively higher temperatures;
a heat exchanger within said first container and including a coolant flow path through which coolant may be flowed to exchange heat with said material;
means surrounding said first container to provide an insulating space about said first container;
coolant inlet and outlet connections extending through said container to said heat exchanger;
a vent for said first container including a vent conduit extending away from a vent opening in said first container; and a check valve in said conduit in close proximity to said vent opening so that stored heat in said phase change material will warm said check valve to prevent condensation of moisture thereat.

39. The heat battery of claim 38 wherein said surrounding means includes a second container spaced from said first container and said conduit is located in the space between said first and second containers so that heat in said phase change material will warm said conduit to prevent condensation therein.

40. A heat battery comprising:

a first container for housing a phase change material that may be in the solid phase at relatively low temperatures and in the liquid phase at relatively higher temperatures on the order of the operating temperature of vehicular engine cooling systems;

a heat exchanger within said first container and including a coolant flow path through which coolant may be flowed to exchange heat with said material;

means surrounding said first container to provide insulation about said first container;

coolant inlet and outlet connections extending through said container to said heat exchanger;

said first container having a top wall flanked by two spaced side walls to be located along a generally horizontal line transverse to the longitudinal axis of a vehicle in which the heat battery is to be installed; and a vent for said first container including an outlet on the exterior of said insulation and an inlet in said top wall of said first container;

a cup-shaped baffle having a downwardly facing opening within said first container and surrounding said inlet;

a quantity of said phase change material in said first container substantially but not completely, filling the same, the quantity being such that said baffle will not be contacted by the phase change material when the heat battery is stationary and in its normal operating position;

the volume of said cup shaped baffle being such that if said downwardly facing opening is covered by said phase charge material as a result of acceleration, deceleration, centrifugal force or uneven terrain, pressure in said first container will pressurize said phase change material into said baffle a distance insufficient to reach said vent inlet before said downwardly facing opening is uncovered by said phase change material to prevent phase change material from being delivered to said vent.

41. The heat battery of claim 40 further including a check valve in said vent.

42. The heat battery of claim 40 further including a filter separating said baffle and said vent, said filter being formed of a material that is not wetted by said phase change material.

43. The heat battery of claim 42 wherein said filter is formed of porous polytetrafluoroethylene.

44. A heat battery comprising a first container for housing a phase change material that may be in the solid phase at relatively low temperatures and in the liquid phase at temperatures on the order of the operating temperature of vehicular engine cooling systems;

a heat exchanger within said first container and including a coolant flow path through which vehicular engine coolant may be flowed to exchange heat with said material;

a second container surrounding said first container in generally spaced relation to provide an insulating space about said first container;

coolant inlet and outlet connections extending through said containers to said heat exchanger;

said first container having a top wall flanked by two spaced side walls to be located along a generally horizontal line transverse to the longitudinal axis of a vehicle in which the heat battery is to be installed; and a vent for said first container including an outlet on the exterior of said second container and an inlet in said top wall of said first container and generally centrally of said spaced side walls;

a cup-shaped baffle having a downwardly facing opening within said first container and surrounding said inlet;

a baffle fixture piece in the space between said containers, said baffle and said baffle fixture piece having interengaging threads extending through an opening in said top wall so as to be self fixturing within said battery;

a check valve connected to said vent opening for allowing fluid flow from said first container but not substantially in the reverse;

a tube having a passage of capillary size connected to said check valve oppositely of said vent opening;

a fixture including a valve receiving pocket in fluid communication with said baffle fixture piece;

said check valve being movably received in said pocket and when located therein, sealingly engaging said fixture;

means biasing said check valve into said pocket and sealed engagement therewith, said biasing means being such as to be overcome by a predetermined pressure at said vent opening so that said check valve will begin to move out of said pocket and said sealed engagement therewith to relieve the pressure at said valve opening even if said check valve remains closed;

an opening in said second container and aligned with said fixture;

a conduit extending between said fixture and said second container opening and removably containing said tube and said check valve;

said conduit being made up of two aligned tube sections and a bellows interconnecting said tube sections;

a filter for said vent opening made up of a material that is not wetted by said phase change material;

an enlarged reservoir connected to said tube and located exteriorly of said second container; and a vent in an upper surface of said reservoir;

a quantity of said phase change material being located in said first container to substantially but not completely fill the same, the quantity being such that the baffle will not be contacted by the phase change material when the heat battery is stationary and in its normal operating position;

the volume of said cup shaped baffle being such that if said downwardly facing opening is covered by said phase change material as a result of acceleration, deceleration, centrifugal force or uneven terrain, pressure in said first container will pressurize said phase change material into said baffle at a distance insufficient to reach said check valve before said downwardly facing opening is uncovered by said phase change material to prevent phase change material from being delivered to said vent.

* * * * *